UNITED STATES PATENT OFFICE.

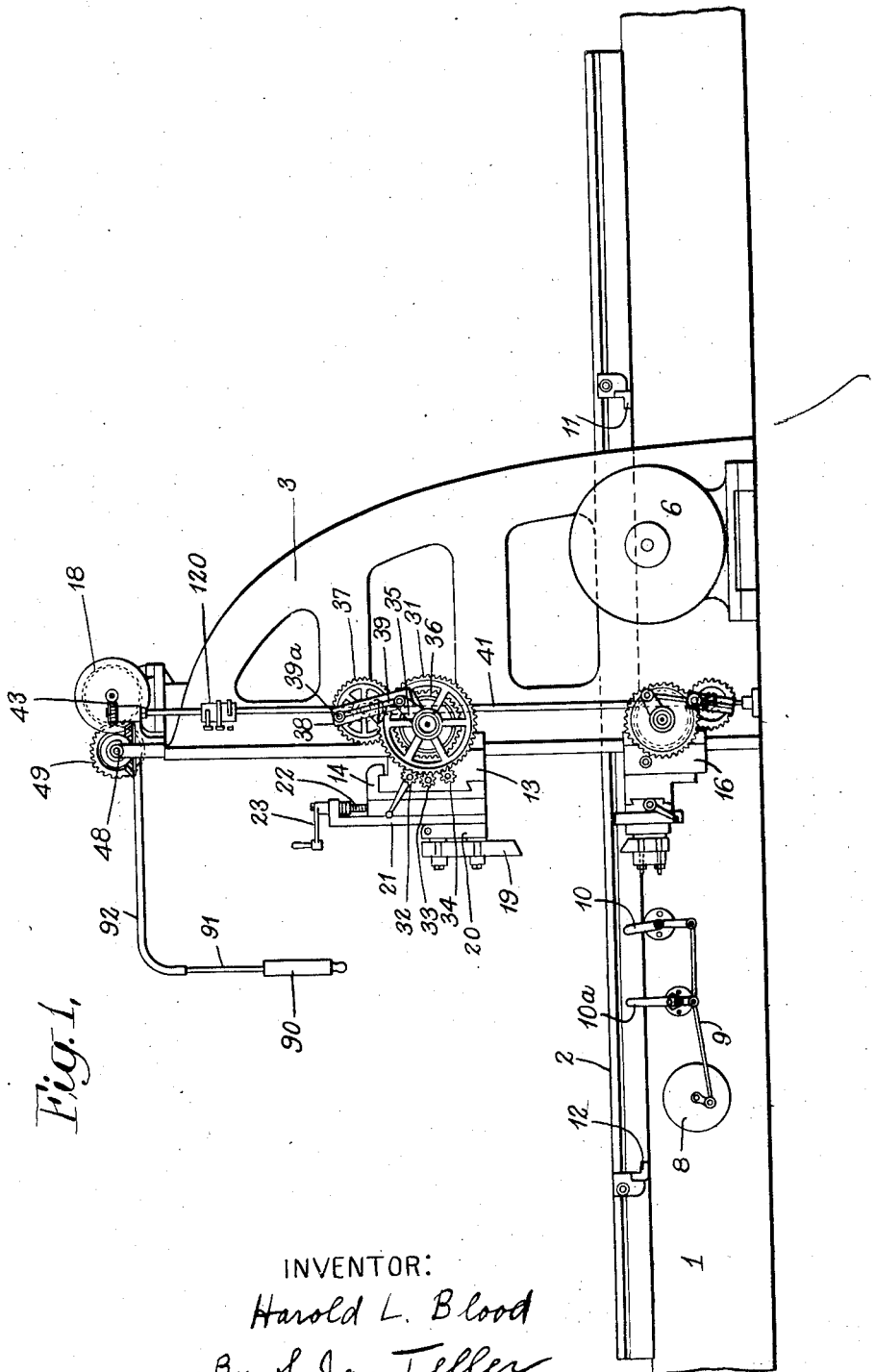

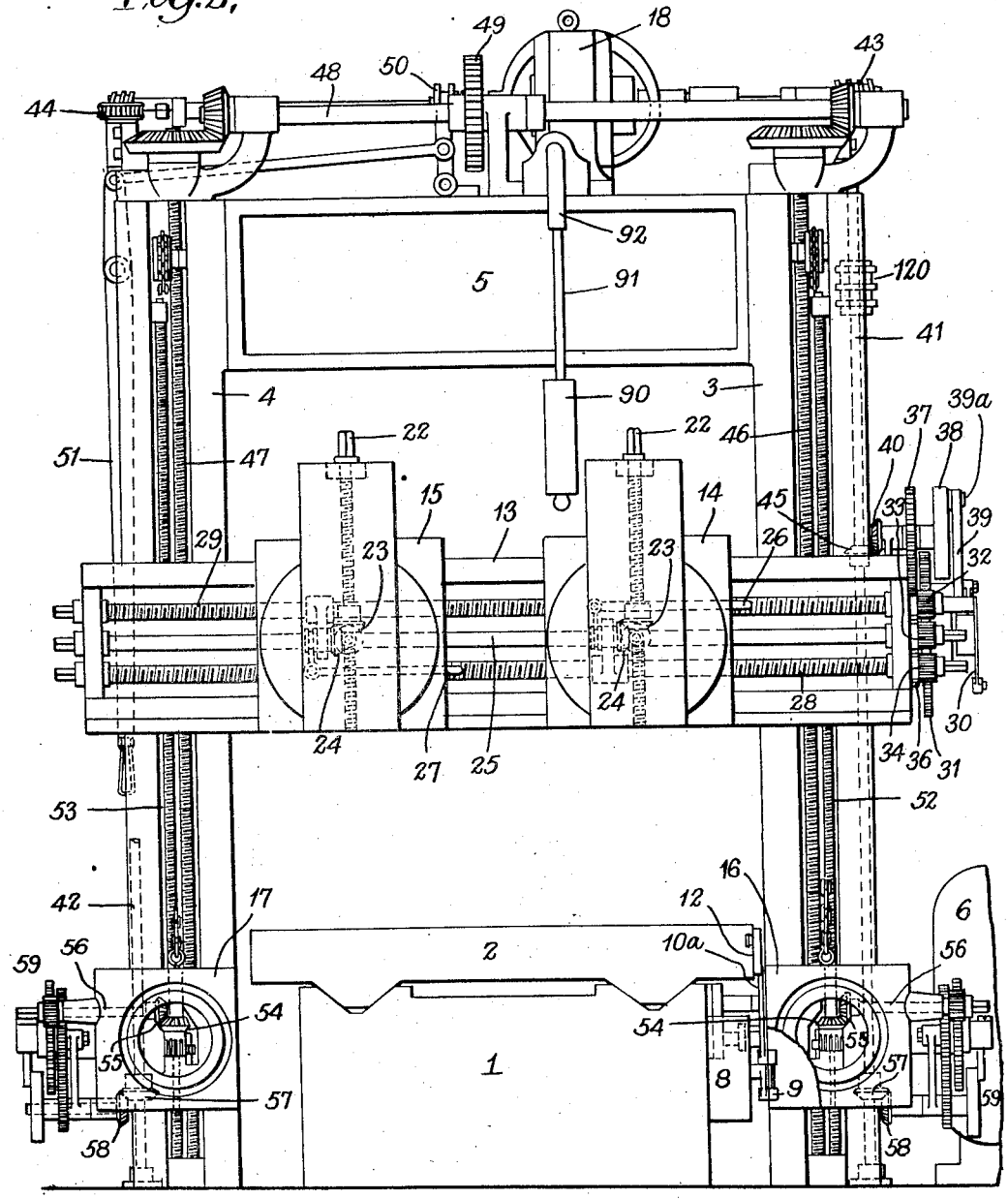

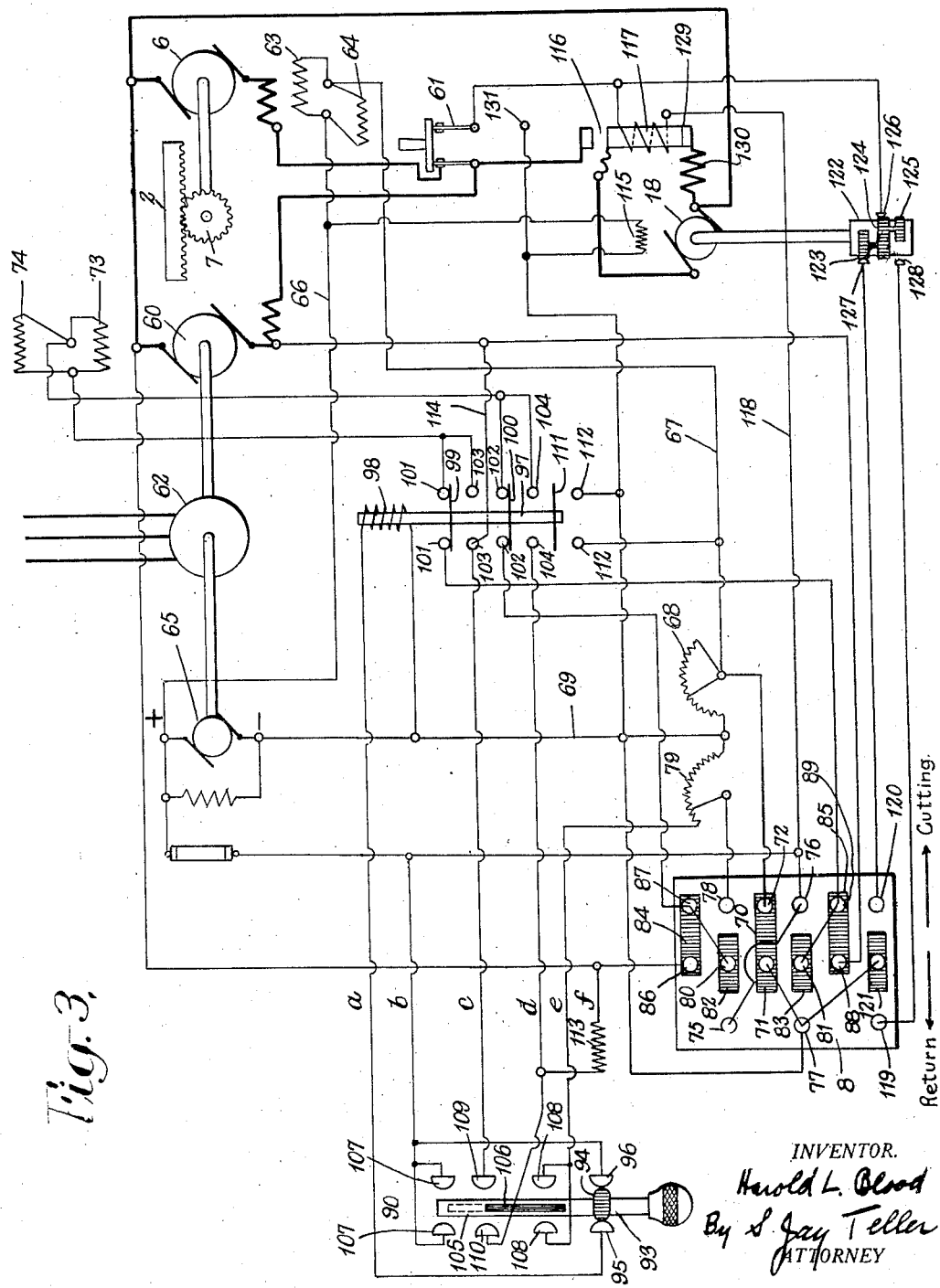

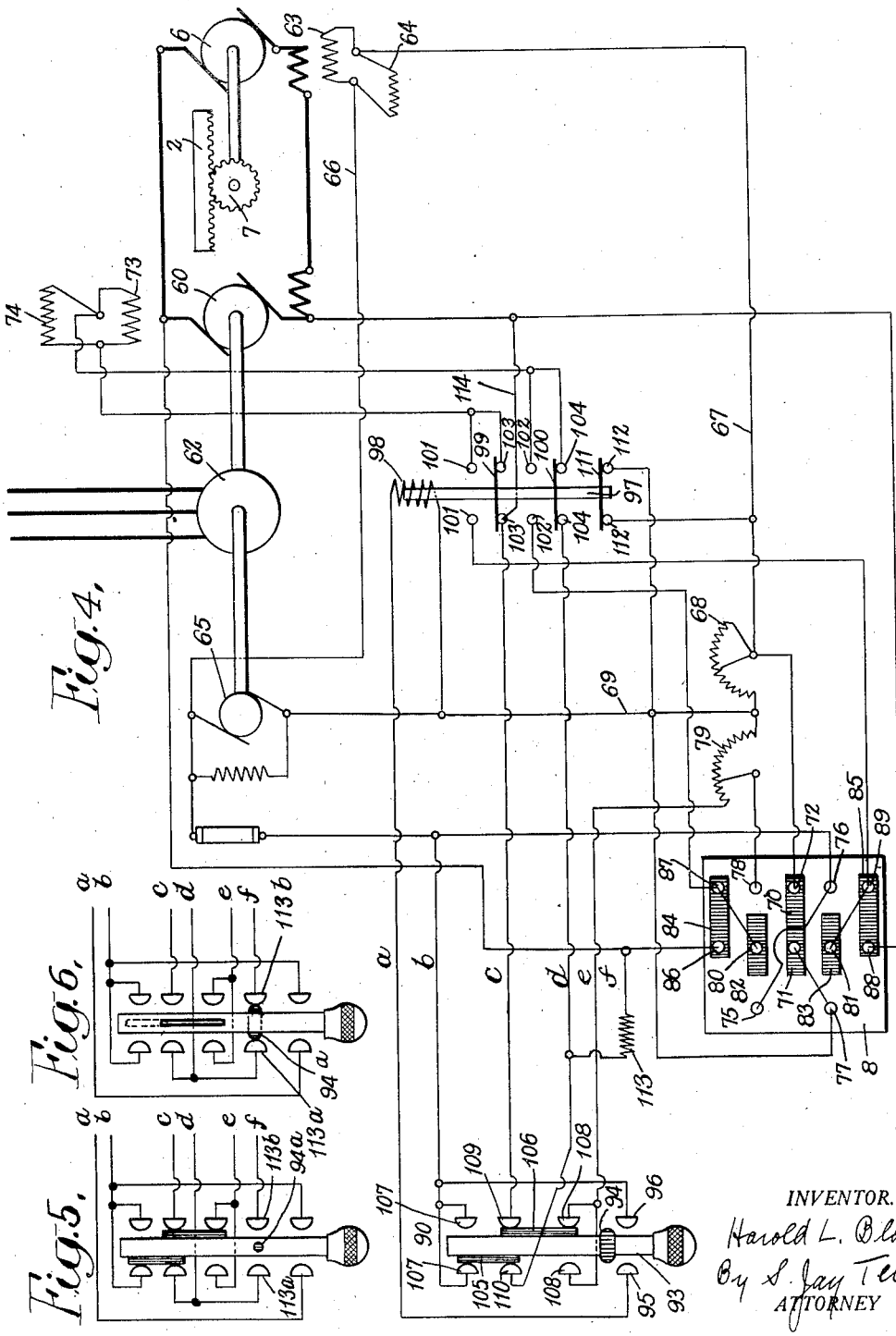

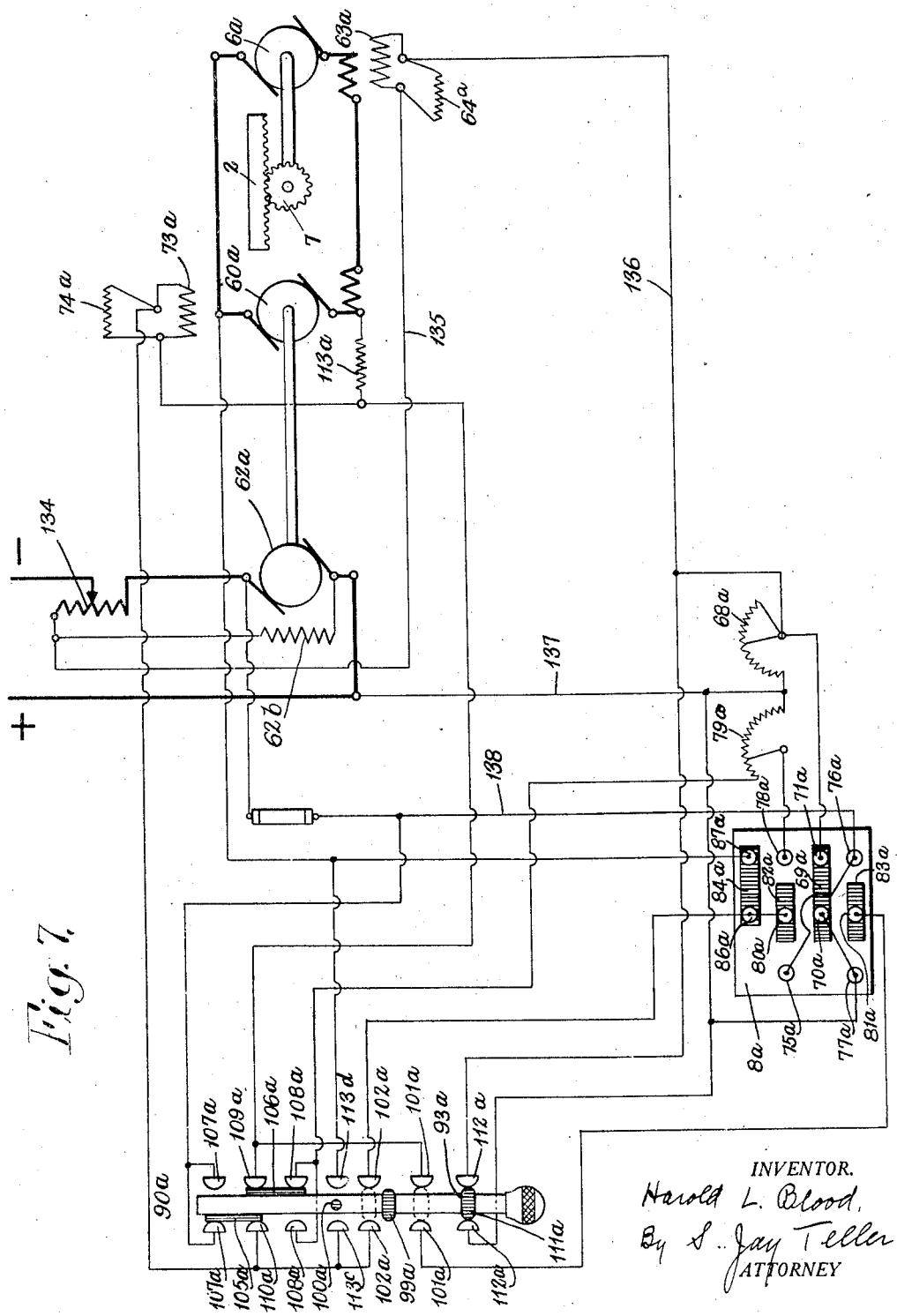

HAROLD L. BLOOD, OF PLAINFIELD, NEW JERSEY, ASSIGNOR TO NILES-BEMENT-POND COMPANY, OF JERSEY CITY, NEW JERSEY, A CORPORATION OF NEW JERSEY.

PLANER AND SYSTEM OF MOTOR CONTROL THEREFOR.

1,389,342.          Specification of Letters Patent.     Patented Aug. 30, 1921.

Application filed March 15, 1917. Serial No. 154,927.

*To all whom it may concern:*

Be it known that I, HAROLD L. BLOOD, a citizen of the United States, and a resident of Plainfield, in the county of Union and State of New Jersey, have invented certain new and useful Improvements in Planers and Systems of Motor Control Therefor, of which the following is a specification.

The invention relates particularly to planers of the type in which each is provided with a reversing driving motor and a generator connected in normally closed circuit with the motor to supply current thereto and to control it, but as concerns some of the features the invention is not so limited. It will be understood that when I refer to a planer I intend to include any mechanism, particularly a machine tool, having the same essential characteristic elements.

One object of the invention is to provide a planer of the type referred to having improved means for supplying current to the fields of the generator and motor.

Another object of the invention is to provide an improved manually operable supplemental switch and connections therefor whereby the generator and the motor can be controlled independently of the automatic circuit making and breaking devices.

Another object of the invention is to provide in combination with the generator and the main driving motor, a supplemental feed motor and control devices therefor adapted to receive current from the generator and preferably to be controlled by the aforesaid manually operable supplemental switch.

Other objects of the invention will be apparent from the following specification and claims.

The invention can be embodied in any one of a number of ways, particularly as concerns the mechanical features thereof; but in order that one embodiment of the invention may be clearly understood, I have shown in the drawings and will herein describe a planer, the mechanical construction of which is similar to that set forth in the application of Greenleaf & Keefer for machine tools, Serial No. 769,859, filed May 26th, 1913. For details of the construction in addition to those herein set forth, reference can be had to the said application. Some of the electrical features of the invention are in some respects similar to those set forth in my copending application for planers and systems of motor control therefor, Serial No. 863,600, filed September 26th, 1914. It will be understood, however, that as concerns both the mechanical and the electrical features, the drawings and the description are to be understood as merely illustrative, and are not to be construed as defining or limiting the scope of the invention, the claims appended to this specification being relied upon for that purpose.

Of the drawings:

Figure 1 is a side elevation of a planer embodying the invention.

Fig. 2 is a front elevation.

Fig. 3 is a diagram of electrical connections.

Fig. 4 is a diagram of electrical connections similar to Fig. 3 but showing some of the parts in different positions and also omitting other parts.

Figs. 5 and 6 are views showing an alternate form of manually operable switch adapted to be substituted for the switch shown in Figs. 3 and 4.

Fig. 7 is a diagram of electrical connections constituting another embodiment of the invention.

Referring particularly to Figs. 1 and 2 of the drawings, 1 represents the planer bed, 2 the reciprocating table, 3 and 4 the uprights or housings and 5 the arch connecting the housings. For reciprocating the table 2 on its bed there is provided a reversing electric motor 6 which is connected with the table in any usual or preferred way, as for instance, by means of the gearing 7 diagrammatically illustrated in Fig. 3. For controlling the electric circuits in the manner to be herein described, there is provided a controlling or pilot switch 8. This switch is operated by means of a rod 9 connected to levers 10 and 10$^a$ which are engaged respectively by dogs 11 and 12 secured to the reciprocating table. These dogs are adjustable to regulate the length of the stroke.

Coöperating with the reciprocating table to act upon work carried thereby, there are one or more cutting tools carried by suitable heads. So far as the broader phases of my invention are concerned, the number of tool heads and the relative positions thereof are immaterial. I prefer, however, to provide four tool heads as shown in the drawings. In the construction illustrated there is a vertically movable cross rail 13 which is fitted to vertical guides on the uprights 3 and 4. Transversely movable along the cross rail 13 are one or more (in this case two) tool heads 14 and 15. Preferably also there are provided two side tool heads 16 and 17 which are vertically adjustable along the guides on the uprights 3 and 4.

I preferably provide an electric motor 18 for effecting preliminary adjustment of the tools and for feeding them during operation of the planer, this motor being preferably mounted upon the arch 5 as shown. Means are provided for operating the feed motor 18 in either direction as will be fully set forth.

For connecting the motor with the tool heads I prefer to use mechanism which, as aforesaid, is similar to that set forth in the Greenleaf & Keefer application Serial No. 769,859. It will be necessary herein to refer only to the essential features of this mechanism, as reference can be had to the said application for the several details.

In Fig. 1 one of the tools is indicated at 19, this being carried by a clapper and clapper box 20 secured to a slide 21 vertically movable on the saddle of the tool head 14. For the sake of clearness the tools and the clappers and clapper boxes have been omitted from the Fig. 2. For moving the slides 21 vertically with respect to their saddles, adjusting screws 22 are provided which can be operated manually if desired by means of a crank such as shown at 23. Splined upon each of these screws is a bevel gear 23 which is connected with a bevel gear 24 loosely mounted on a transverse shaft 25 rotatable in bearings on the cross rail 13. By means of clutch elements splined to the shaft 25 and controllable respectively by the hand levers 26 and 27, either of the gears 24 can be connected with the shaft 25 so that when the shaft 25 is rotated the corresponding screw 22 will be turned to raise or lower the corresponding slide 21 and the tool carried thereby.

Transverse threaded screws 28 and 29 are provided to respectively control the transverse movements of the tool heads 14 and 15, these screws being parallel to the shaft 25 and similarly mounted.

The shafts and screws 25, 28 and 29 can be moved manually when desired, as for instance, by means of a crank 30 as indicated in Fig. 2. In order that the shafts may be rotated by power, a spur gear 31 is mounted at one end of the cross rail in position to mesh with pinions 32, 33 and 34 detachably mounted respectively on the ends of the shafts 29, 25 and 28. Each of these pinions is preferably in the form of a "click box" having a reversible ratchet device which permits transmission of power from the pinions to the shafts in one direction only, and the construction is therefore such that by putting in place or removing the click boxes and by properly adjusting the ratchet devices thereof one or more of the shafts or screws can be intermittently moved in one direction when the gear 31 is oscillated, or can be continuously moved in the same direction when the gear 31 is continuously moved. For actuating the gear 31 there is provided a crank arm 35 at one side of the gear and a gear 36 at the other side thereof, both of these devices being loosely mounted. By means of a suitable clutch mechanism, either the crank 35 or the gear 36 can be connected with the gear 31. A gear 37 meshes with the gear 36 and a feed plate 38 is connected with the crank 35 by means of a connecting rod 39 and an adjustable pin 39ª the said gear and feed plate being connected together and driven by means of a bevel gear 40. Two vertical shafts 41 and 42 are mounted on the uprights 3 and 4 and are driven by the motor 18 through worm and wheel gearing at 43 and 44. Splined on the shaft 41 is a bevel gear 45 which meshes with the aforesaid bevel gear 40 and thus transmits power to rotate the gear 36 by means of the gear 37 and to oscillate the crank 35 by means of the feed plate 38 and the connected rod 39. It will be seen that if the motor be operated to rotate the feed plate 38 through a definite angle, as for instance through a whole revolution or a half revolution, and that if the gear 31 be connected with the crank 35, one or more of the shafts 25, 28 and 29 will be rotated in one direction or the other as required through a definite angle, thus moving one or the other or both of the tool heads to the right or to the left as required or moving one or the other or both of the slides 21 upward or downward as required. If the motor 18 be operated continuously in one direction or the other and if the gear 31 be connected with the gear 36, then either or both of the tool heads can be moved continuously in either direction as required or either or both of the slides 21 can be moved continuously in either direction as required.

For the purpose of adjusting the cross rail 13 vertically, two screws 46 and 47 are provided which are connected by means of suitable bevel gearing with a transverse shaft 48 connectible with the motor 18 by means of gearing 49 and a clutch 50 manually operable by means of a lever 51. It will be seen that by engaging the clutch 50 and starting the motor 18 in one direction or the other the cross rail 13 may be raised or lowered as required.

The side tool heads 16 and 17 can be provided with cross slides and other means of tool adjustment as required, such parts being shown in Fig. 1 but omitted in Fig. 2 for the sake of clearness. For controlling the vertical movement of the side heads vertical screws 52 and 53 are provided. Splined upon each of these screws is a nut rotated by a bevel gear 54 which meshes with a bevel gear 55 on a transverse shaft 56 carried by the corresponding tool head. By rotating this shaft 56 either manually or by power, the tool head may be raised or lowered. For applying power to the shaft 56 of each tool head there is provided a bevel gear 57 which is splined to the corresponding vertical shaft 41 or 42. Each gear 57 meshes with a gear 58 and the gear 58 drives a mechanism 59 which is similar to that already described for applying power to the shafts 25, 28 and 29. A repetition of the description is unnecessary, and it will be understood that when the motor is rotated through a definite angle either or both of the tool heads 16 and 17 can be raised or lowered as required through a definite distance, and that when the motor is rotated continuously either or both of the tool heads can be moved continuously upward or downward as required. It will be observed that the amount of movement of either side head can be adjusted independently of the amount of movement of the cross heads.

The main motor 6 receives its current from a generator 60, the armatures of the motor and the generator being connected in a circuit which is permanently closed during normal operation of the planer, the switch at 61 being closed as shown. The generator 60 is continuously driven as for instance by means of the motor 62 which is shown as an alternating current motor.

The motor 6 has a field winding 63 which is continuously energized from any suitable external source of direct current. Preferably a choke coil 64 is provided for protecting the field. When the initial power motor 62 is an alternating current motor as indicated, there is preferably provided a supplemental direct current exciter generator 65 driven by the motor 62. One pole of the generator 65 is connected with the field 63 by means of the conductor 66 and the circuit is completed by means of the conductor 67, the adjustable resistance 68 and the conductor 69.

The generator 60 has a field winding 73 which is adapted to be energized from any suitable external source of direct current, preferably from the same source from which the field 63 of the motor 6 is energized. Preferably there is provided a choke coil 74 for protecting the field 73. In the present construction the field 73 is energized by current from the exciter generator 65.

The automatic table operated switch 8 is provided with stationary contacts 75 and 76 connected with one pole of the generator 65 and with stationary contacts 77 and 78 connected with the other pole of the generator 65. The contact 77 is directly connected with the generator and the contact 78 is connected through an adjustable resistance 79. The switch also has stationary contacts 80 and 81 which are respectively connected with opposite sides of the generator field 73. Movable contact bars 82 and 83 are provided on the switch 8. When the switch is in its cutting position the contacts 78 and 80 are connected and also the contacts 76 and 81, thus energizing the field 73. In this position the resistance 79 is included in the circuit and the field current is to some extent reduced. Inasmuch as the armatures of the generator 60 and the motor 6 are connected in a closed circuit, as already stated, the energization of the field 73 causes the generator to generate a current which is transmitted to the motor armature. The electrical connections are such that the current is in the proper direction to cause the motor to rotate in the direction to move the planer table in the direction for cutting.

When the planer table is to be reversed the motor 6 must be reversed, and this is effected by reversing the current produced by the generator 60. The generator current is reversed by reversing the energization of the field 73. The switch 8 is moved toward the left and the contact bar 82 connects the contacts 75 and 80 and the contact bar 83 connects the contacts 77 and 81. In this way current is sent through the generator field 73 in the reversed direction, the resistance 79 being excluded from the circuit. The field excitation is now stronger than it was before and the result is that current is generated at a higher voltage, thus tending to cause the motor to rotate at a higher speed and drive the table at the relatively high speed which is desirable for the return stroke.

As already stated, the switch 8 is automatically operated by the planer table, it being moved toward the right at the end of the return stroke to start the cutting stroke, and being moved toward the left at the end of the cutting stroke to start the return stroke.

During the movement of the planer table in the cutting direction, the resistance 68 is preferably short-circuited in order that the field 63 may be strongly energized, thereby causing the motor to have a large torque and a relatively slow speed. When the motor is reversed to drive the table in the return direction, the resistance 68 is in circuit in order to reduce the field strength and thereby give increased speed.

The cutting of the resistance 68 into and out of the field circuit is effected by means of the automatic table operated switch 8. As shown in Figs. 3 and 4, the switch is in central or neutral position and is movable toward the right to operate the motor 6 in the cutting direction and toward the left to operate the motor in the return direction.

The switch is provided with a movable contact bar 70 which connects stationary contacts 71 and 72 when the switch is in cutting position, but does not connect them when the switch is in return position. Preferably, as indicated, the contact bar 70 is sufficiently long to connect the contacts when the switch is in neutral position, thus maintaining the field 63 strongly energized.

It will be observed that by adjusting the resistance 79 the speed of the motor during the cutting stroke can be regulated and that by adjusting the resistance 68 the speed of the motor during the return stroke can be regulated.

When the generator 60 is deënergized at the end of a stroke, the motor 6 acts as a generator to effect dynamic braking. It is desirable to have this braking effect of the motor definite and uniform and as powerful as is possible without producing excessive current. As has been stated, the field 63 of the motor is fully energized when the switch 8 is in neutral position. This is important in order to insure a maximum braking effect not only during normal operation but also when the switch is manually thrown to neutral to stop the planer.

In order that the generator 60 may not interfere with the flow of the braking current, it is desirable to so construct and connect the generator that its residual magnetism assumes approximately zero value promptly upon the deënergization of the field. A minimum residual magnetism of the generator is also desirable to prevent "creeping" of the motor when the switch 8 is in neutral position. Ordinarily, when the planer is to be stopped the switch 8 is moved to its neutral position, thus deënergizing the field 73. It has been found, however, that in some earlier constructions the residual magnetism of the generator was sufficient to cause a small current to flow through the motor, rotating the motor slowly and slowly moving the planer table. When the planer table reached one end of its stroke it moved the automatic switch into one of its operative positions, thus causing the planer to begin regular movements.

In order to avoid the difficulties above referred to, I provide a construction similar to that set forth in my aforesaid application Serial No. 863,600.

The field poles of the generator are preferably constructed of laminated metal and means are provided for supplying a preliminary reversed current to the field of sufficient strength to substantially overcome such residual magnetism as may exist notwithstanding the laminated field construction. The switch 8 is provided with movable contact bars 84 and 85 adapted respectively to connect the stationary contacts 86 and 87 and 88 and 89. The contacts 87 and 89 are connected respectively with the two sides of the field 73, use being made of the same conductors which lead to the aforesaid contacts 80 and 81. The contacts 86 and 88 are connected respectively to the two poles of the generator 60. The contact bars 84 and 85 are so positioned on the switch that the respective contacts are connected as stated when the switch is in neutral position. The connections are such that the current in the motor generator circuit is made to flow through the field coil 73 in the reversed direction, thus overcoming substantially all of the residual magnetism. During normal operation of the planer the reversed current flows only instantaneously while the switch is moving past the neutral position. When the planer is stopped the connection is maintained, thus preventing the generator from producing such a current as would cause creeping of the motor and of the planer table.

I prefer to have the field 73 entirely disconnected from the main generator-motor circuit except when the said supplemental reversed current is flowing. It is for this reason that I have provided means for making and breaking the connections at both sides of the field by means of the contact bars 84 and 85. Obviously it would be possible to make and break the connection at one side only leaving the other side permanently connected. But such an arrangement would at certain times cause the electromotive force of the generator 60 to be added to that of the generator 65, thus adding to the difficulties of insulation and being otherwise objectionable.

Preferably I provide a supplemental manually operable switch by means of which the planer can be controlled for effecting preliminary adjustments and for other purposes. This switch is preferably a pendent switch 90 located at any convenient place and connected by means of a flexible cable 91. As shown, the switch is suspended from a pipe or bar 92 carried by the arch 5 of the planer.

The switch 90 in its preferred form comprises a manually operable core 93 which is movable longitudinally and angularly. Secured to the core is a contact 94, which during normal operation of the planer, as shown in Fig. 3, serves to connect the relatively fixed contacts 95 and 96. 97 is a switch operable by means of a solenoid 98, this solenoid being connected to receive current from the generator 65 and being in circuit with the aforesaid contacts 95 and 96. When the said contacts are connected, the solenoid is energized and the switch is held in its upper position as shown. When the core 93 is moved upward to the position shown in Fig. 4, the contacts 95 and 96 are disconnected and the solenoid is deënergized, thus permitting the switch 97 to move to its lower position. The switch 97 is provided with two contact bars 99 and 100. When the switch 97 is in the position for normal operation, that is in its upper position, the bars 99 and 100 respectively connect contacts 101, 101 and contacts 102, 102. The contacts 101, 101 are in the connection between the contacts 81 and 89 and one side of the generator field 73, and the contacts 102, 102 are in the connection between the contacts 80 and 87 and the other side of the generator field. Therefore when the core 93 of the switch 90 is in its lower position the connections between the generator field and the contacts of the switch 8 are complete, but when the core 93 is moved to its upper position the said connections are broken and the switch 8 is rendered entirely inoperative for controlling the field 73.

The contact bars 99 and 100 when in their lower positions respectively connect the contacts 103, 103 and 104, 104. Secured to the core 93 of the switch 90 are two contact bars 105 and 106. Near the top of the switch are two relatively fixed contacts 107, 107 connected to one pole of the direct current generator 65, and near the bottom of the switch are two other relatively fixed contacts 108, 108 connected to the other pole of the generator, preferably through the aforesaid resistance 79. There is also provided a relatively fixed contact 109 which is connected with one side of the generator field 73 through the contacts 103, 103 and the bar 99 when the switch 97 is in its lower position. Opposite the contact 109 is a similar contact 110 connected with the other side of the generator field through the contacts 104, 104 and the bar 100 when the switch 97 is in its lower position.

During normal operation of the planer the contact bars 105 and 106 are out of engagement with any of the contacts of the switch 90 as shown in Fig. 3. When it is desired to control the planer by means of the supplemental switch, the core 93 thereof is first moved upward, thus opening a circuit of the solenoid 98 and permitting the switch 97 to move to its lower position. As already stated, this movement of the switch 97 renders the switch 8 entirely inoperative to control the generator field 73. Then the operator turns the core 93 in one direction or the other in accordance with the direction in which he desires to move the planer table. As shown in Fig. 4, the core has been turned to bring the contact bar 105 into engagement with the contact 110 and the corresponding contact 107, and to bring the contact bar 106 into engagement with the contact 109 and the corresponding contact 108. In this way a circuit is completed from the generator 65 through the generator field 73 in one direction, thus causing the motor 6 to rotate in the corresponding direction. If the opposite direction of movement is desired, the core 93 is turned to a position opposite to that shown in Fig. 4, thus reversing the connections for the field 73 and causing the motor 6 to operate in the opposite direction.

Preferably, in order that the motor 6 may rotate at a slow speed when under the control of the switch 90, I provide means for short-circuiting the resistance 68, thus giving the motor field 63 increased strength. This short-circuiting means preferably comprises a contact 111 on the switch 97 which serves to connect the contacts 112, 112 when the switch is in its lower position. The connection of the generator field through all of the resistance 79 still further decreases the speed of the motor.

In order to supply a supplemental reversed current for the generator field to operate in the manner aforesaid and prevent creeping of the motor, I preferably provide suitable connections associated with the switch 90. As shown in Figs. 3 and 4 there is a high resistance connection 113 which is continuously operative while the switch 97 is in its lower position. By means of this connection a circuit is established from the upper pole of the generator 60 through the connection 113, the contacts 104, 104, the field 73, the contacts 103, 103 and the wire 114 back to the lower pole of the generator. This circuit is continuously closed while the generator is under the control of the switch 90, but on account of the high resistance at 113 the current is not of sufficient strength to interfere with the ordinary control of the generator by means of the switch 90; but when the ordinary circuits through the generator field are broken, sufficient current flows through this supplemental circuit to substantially overcome residual magnetism. Inasmuch as the normal connections for supplying current to the generator field are broken at both sides by means of the switch 97, the field is entirely disconnected from the exciter generator 65 and this generator can have no effect on the potential at which the field is maintained.

In Figs. 5 and 6 I have shown a form of auxiliary switch with connections therefor which may be substituted for the switch shown in Figs. 3 and 4. By the letters $a$, $b$, $c$, $d$, $e$ and $f$ I have indicated the wires in Figs. 5 and 6 which correspond respectively to the wires of Figs. 3 and 4. It will be observed that the construction in Figs. 5 and 6 is substantially the same as that shown in Figs. 3 and 4 except that two supplemental contacts $113^a$ and $113^b$ are provided in position to be engaged by the contact $94^a$ when in its upper position. The contact $94^a$ is similar to the contact 94 but is in the form of a pin instead of a ring as shown in Figs. 3 and 4. The contact 94ª serves to directly connect the wires $d$ and $f$ when the switch 90 is in neutral position, thus supplying to the generator field 73 a stronger reversed current than can flow through a resistance such as 113. In this way the residual magnetism is more quickly overcome and a more rapid stopping of the motor 6 is effected.

Preferably as already stated, there is provided a supplemental electric motor 18 for moving the cutting tools both preliminarily to effect adjustments and during normal operation to effect feeding. The feed motor is shown in Fig. 3 but has been omitted from Fig. 4 partly for the sake of simplicity and partly to illustrate the fact that the invention as concerns certain features thereof is not limited to a feed motor.

By preference, the feed motor 18 is connected to receive current from the generator 60 and to be controlled at least in part by the switches 8 and 90. When the switch 61 is in its upper position as shown, it will be seen that the motor 18 is connected with the generator 60 in parallel with the motor 6, the current supplied to the motor 18 being therefore reversed as the main motor current is reversed. The motor 18 is provided with a shunt field 115 which is continuously energized by current from the generator 65.

Connected in the armature circuit of the motor 18 is a switch 116 which is preferably a relay switch controllable by a solenoid 117. One end of the coil of the solenoid is connected directly with one pole of the generator 65, by means of the wire 118, and the other end of the coil of the solenoid is connectible with the other pole of the generator through a suitable table operated switch. For the sake of convenience and simplicity the table operated switch may be in the form of supplemental contacts on the aforesaid switch 8. As shown, the last said end of the coil of the solenoid is connected or at least connectible with stationary contacts 119 and 120 on the switch 8, and the last said pole of the generator 65 is connected with a movable contact bar 121 on the switch 8. When the switch 8 is in neutral position as shown, the circuit for the solenoid 117 is broken and the switch 116 is open. When the switch 8 is moved to either of its operative positions, the contact bar 121 engages one of the contacts 119 or 120 and completes the circuit for the solenoid 117, thus closing the switch 116 and causing the feed motor 18 to begin operation simultaneously with the reversal of the generator polarity.

Preferably, in order to stop the operation of the feed motor and of the parts driven thereby, after movement to a definite extent, there is provided a limit switch such as indicated at 122. This limit switch is directly connected with the motor 18 to be operated thereby and comprises a drum having thereon three connected contacts 123, 124 and 125. The contact 124 is a ring which is continuously in engagement with a contact 126 and the contacts 123 and 125 are segments adapted respectively to engage contacts 127 and 128. In the position shown in Fig. 3 the switch 122 connects the coil 117 with the contact 120 of the switch 8. If the switch 8 be moved toward the right the circuit for the coil 117 will be completed and the switch 116 will be closed, thus starting the motor 18. The motor will continue to operate until the contact 123 disengages the contact 127, whereupon the coil 117 is deënergized and the motor circuit is broken. Upon the disengagement of the contact 123 from the contact 127 or prior thereto the contact 125 engages the contact 128, thus completing the connection from the coil 117 to the contact 119 and preparing for the subsequent energization of the coil when the switch 8 is moved toward the left. In this way the motor 18 is operated intermittently, and in opposite directions at each actuation of the switch 8. Each movement of the motor is of a definite predetermined extent, and when the motor is connected with the tools in the way shown the movement is preferably such as to rotate the shaft 41 through a half revolution. The tools are fed during rotation of the shaft in one direction but not during rotation in the other direction. The extent of movement of the tools can be changed as required by means of the several adjusting devices that have been described, without changing the extent of movement of the shaft 41.

Preferably, in order that the motor 18 may stop promptly upon the opening of the switch 116, there is provided a switch 129 at the bottom of the solenoid 117, this switch being closed whenever the switch 116 is open. The switch 129 when closed completes a short circuit through the motor armature and through a braking resistance 130, thus causing the motor 18 to generate a braking current and to effect dynamic braking.

In order that the motor 18 may be used for effecting preliminary adjustments of the tools or for "traversing", I provide means whereby the said motor can be operated independently of the motor 6. The aforesaid switch 61 when opened, interrupts the circuit of the motor 6 without, however, interrupting the circuit of the motor 18. When the circuit of the motor 6 is thus broken the feed motor 18 can be controlled in the way already described by manually moving the switch 8. Preferably, however, I provide means whereby the control of the motor 18 for traversing can be effected by means of the aforesaid switch 90. To this end the switch 61 is provided with a second pole adapted to engage a contact 131 and connect it with the coil 117, the said contact being connected with one pole of the generator 65. A circuit is thus completed through the coil 117 and the switch 116 is kept closed so long as the switch 61 is in its lower position. The switch 90 is now operable to control the generator in the way already described, and to thus operate the motor 18 in one direction or the other as desired.

The operator can prevent movement of the feed motor during control of the main motor by the supplemental switch by seeing to it that the switch 8 is in neutral position. In this way the relay switch 116 is kept open and the motor 18 remains idle.

In order to further illustrate the scope of the invention I have shown in Fig. 7 an alternate construction which differs in many respects from the construction shown in Figs. 3 and 4. In this alternate construction the main driving motor is a direct current motor and the exciter generator 65 is therefore omitted; the feed motor 18 and the connections therefor are omitted; and the relay switch 97 is omitted, an alternate form of supplemental switch being provided to properly control the electrical connections. The specific features of the construction shown in Fig. 7 are not claimed as parts of the present invention, these being presented in my copending application Serial No. 210,624 for planers and systems of motor control therefor, filed January 7th, 1918, as a division of this application.

As shown in this figure, the planer motor $6^a$ and the generator $60^a$ are similar respectively to the motor 6 and the generator 60 as shown in Fig. 3. They are provided respectively with fields $63^a$ and $73^a$ protected respectively by choke coils $64^a$ and and $74^a$. The generator $60^a$ is driven by a direct current motor $62^a$ receiving current from the main positive and negative lead wires. Preferably a starting resistance 134 is connected in the circuit of the motor $62^a$. The motor $62^a$ has a shunt field $62^b$ which is so connected that as the starting resistance is cut out of circuit with the armature it is cut into circuit with the field. If the voltage at the armature fails either because of the opening of the circuit at the starting resistance or because of the failure of the main line voltage the motor becomes a generator producing current so long as it continues to rotate under momentum. The advantage of this construction will be made more fully apparent hereinafter.

The field $63^a$ of the motor $6^a$ is connected with the negative lead by means of a wire 135 and with the positive lead by means of the wire 136, the adjustable resistance $68^a$ and a wire 137, the field being continuously energized. For controlling the operation of the motor and for reversing the connections for the generator field, there is provided an automatic table operated switch $8^a$ similar to the switch 8. There is a connection from one side of the resistance $68^a$ to a contact $71^a$ of the switch $8^a$ and a connection from the other side of the resistance to a contact $70^a$. The switch is provided with a movable contact bar $69^a$ which connects the contacts $70^a$ and $71^a$ when the switch is in its right-hand cutting position or in its central neutral position, thus short-circuiting the resistance $68^a$ and providing a strong field for the motor. In this way the motor is made to rotate slowly on the cutting stroke.

It will be recalled that in the construction shown in Fig. 3 the relay switch 97 is provided with contact bars 99 and 100 which are interposed in the circuit connections between the generator field resistance and the automatic switch. In the present construction the relay switch is omitted and the function thereof is performed by supplemental contacts formed on the auxiliary switch $90^a$. One side of the field $73^a$ is connected with the contact $80^a$ of the switch $8^a$ through contacts $102^a$, $102^a$. Carried by the core $93^a$ is a contact bar $100^a$ which connects the contacts $102^a$, $102^a$ when the core is in its lower position and is turned at right angles to the position shown (see dotted lines in Fig. 7). The other side of the field $73^a$ is connected with the contact $81^a$ through the contacts $101^a$, $101^a$. Carried by the core $93^a$ is a contact ring $99^a$ which connects the said contacts $101^a$, $101^a$ when the core is in its lower turned position (see dotted lines in Fig. 7). The contacts $77^a$ and $78^a$ of the switch $8^a$ are connected with the positive lead through the wire 137, the connection to the contact $78^a$ being through the adjustable resistance $79^a$. The contacts $75^a$ and $76^a$ are connected with the negative lead by means of the wire 138, the connection being such that the starting resistance 134 is included in the circuit.

When the switch $8^a$ is moved toward the left from the position shown, the contacts $80^a$ and $78^a$ are connected by a contact bar $82^a$ and the contacts $81^a$ and $76^a$ are connected by a contact bar $83^a$. Through the connections thus formed current is supplied to the generator field $73^a$ in the proper direction for causing the motor $6^a$ to rotate in the direction for cutting. When the switch is moved toward the left, the contacts $80^a$ and $81^a$ are connected respectively with the contacts $75^a$ and $77^a$ thus supplying current to the generator field in the proper direction for causing the motor to rotate in the return direction.

As in the case of the construction shown in Fig. 3, the speed of the motor during the cutting stroke can be regulated by adjusting the resistance 79ª and the speed during the return stroke can be regulated by adjusting the resistance 68ª.

The wires 135 and 138 are so connected that they will not be disconnected from the upper pole of the generator 62ª when the motor circuit is opened at 134. This enables the motor 62ª while rotating under momentum, to act as a generator as before stated, and supply current to energize the fields of the generator 60ª and the motor 6ª. If these fields were to become deënergized suddenly, the planer table would drift under momentum and would continue past the point of normal reversal without any braking action taking place. For some classes of work, particularly when the tool is cutting in a recess or behind a boss or rib, such drift might be disastrous either to the work or to the machine or to both. With the fields connected in the way shown and described, the normal braking action and reversal will take place so long as the motor 62ª continues in motion.

The switch 8ª is provided with a stationary contact 86ª which is connected with one side of the generator field through the aforesaid contacts 102ª, 102ª, and the switch is also provided with a stationary contact 87ª which is connected with one pole of the generator. The other pole of the generator is connected directly with the other end of the field, preferably through the resistance 113ª. The switch 8ª has a movable contact bar 84ª which connects the two contacts 86ª and 87ª when the switch is in neutral position, thus sending a reversed current through the generator field which serves to overcome residual magnetism in the way already described in connection with Figs. 3 and 4.

When the planer is to be controlled manually by means of the switch 90ª the core 93ª of the switch is moved upward to the level shown in Fig. 7. This upward movement disconnects the contacts 102ª, 102ª and the contacts 101ª, 101ª, thus entirely disconnecting the automatic switch 8ª and rendering it inoperative.

The switch 90ª is provided with contacts 107ª, 107ª, 108ª, 108ª, 109ª and 110ª corresponding respectively as to position and to connection with the contacts 107, 107, 108, 108, 109 and 110 of the switch 90 shown in Figs. 3 and 4. Connected with the core 93ª are contact bars 105ª and 106ª corresponding respectively to the contact bars 105 and 106 of the switch shown in Figs. 3 and 4. When the switch is turned to one position as shown in Fig. 7, the contact 109ª is connected with the corresponding contact 108ª and the contact 110ª is connected with the corresponding contact 107ª. In this way the generator field is energized for causing rotation of the motor in one direction. When motion of the motor in the other direction is desired, the switch is moved to connect the contact 109ª with the corresponding contact 107ª and to connect the contact 110ª with the corresponding contact 108ª.

The switch is provided with two opposite contacts 113ᶜ and 113ᵈ which are adapted to be connected by the aforesaid bar 100ª when the switch is in its central neutral position. The connecting of these two contacts completes a circuit through the generator field from the poles of the generator, thus supplying a reversed current to overcome residual magnetism. Inasmuch as the normal circuit for the generator field has been broken at both sides by means of the switch 90ª, the field is entirely disconnected from the main leads and these therefore can not affect the potential at which the field is maintained.

Preferably, in order that the motor 6ª may rotate slowly when under the control of the supplemental manually operable switch, the resistance 68ª is short-circuited, thus giving the motor field its maximum strength. The switch 90ª is provided with two contacts 112ª, 112ª which are connected by the contact ring 111ª when the supplemental switch is in its upper operative position as shown.

What I claim is:

1. The combination of a reciprocating table, a reversing electric motor connected with the table, an automatic table actuated switch normally serving to successively reverse the motor and cause it to drive the table successively in opposite directions, a manually operable switch supplemental to the table actuated switch for controlling and reversing the motor, and a relay switch automatically operable upon movement of the supplemental switch to an operative position and serving to render the table actuated switch inoperative.

2. The combination of a reciprocating table, a reversing electric motor connected with the table, an automatic table actuated switch normally serving to successively reverse the motor and cause it to drive the table successively in opposite directions, a manually operable switch supplemental to the table actuated switch for controlling and reversing the motor, and a relay switch automatically operable to disconnect the table actuated switch upon movement of the supplemental switch to an operative position and automatically operable to disconnect the supplemental switch upon movement thereof to an inoperative position.

3. The combination of a reciprocating table, a reversing electric motor connected to the table, a generator having its armature connected in closed circuit with the motor armature, an automatic table operated switch for successively reversing the field circuit of the generator to change the polarity and thereby successively reverse the motor and cause it to drive the table successively in opposite directions, a manually operable switch supplemental to the table operated switch for controlling and reversing the field current of the generator, and means automatically operable by the supplemental switch for rendering the automatic switch inoperative when the supplemental switch is in use.

4. The combination of a reciprocating table, a reversing electric motor connected to the table, a generator having its armature connected in closed circuit with the motor armature, an automatic table operated switch for successively reversing the field circuit of the generator to change the polarity and thereby successively reverse the motor and cause it to drive the table successively in opposite directions, a manually operable switch supplemental to the table operated switch for controlling and reversing the field current of the generator, and a relay switch automatically operable by the supplemental switch for rendering the automatic switch inoperative when the supplemental switch is in use.

5. The combination of a reciprocating table, a reversing electric motor connected to the table, a generator having its armature connected in closed circuit with the motor armature, an automatic table operated switch for successively reversing the field circuit of the generator to change the polarity and thereby successively reverse the motor and cause it to drive the table successively in opposite directions, a manually operable switch supplemental to the table operated switch for controlling and reversing the field current of the generator, and means automatically operable to disconnect the automatic switch when the supplemental switch is in use and automatically operable to disconnect the supplemental switch when it is not in use.

6. The combination of a reciprocating table, a reversing electric motor connected to the table, a generator having its armature connected in closed circuit with the motor armature, an automatic table operated switch for successively reversing the field circuit of the generator to change the polarity and thereby successively reverse the motor and cause it to drive the table successively in opposite directions, a manually operable switch supplemental to the table operated switch for controlling and reversing the field current of the generator, and a relay switch automatically operable to disconnect the automatic switch when the supplemental switch is in use and automatically operable to disconnect the supplemental switch when it is not in use.

7. The combination of a reciprocating table, a reversing electric motor connected with the table, a resistance in circuit with the motor field, an automatic table actuated switch normally serving to successively reverse the motor and cause it to drive the table successively in opposite directions, connections normally under the control of the table actuated switch for short-circuiting the said resistance, a manually operable switch supplemental to the table actuated switch for controlling and reversing the motor, and means automatically operable to short-circuit the motor field resistance upon movement of the supplemental switch to an operative position, the said means being supplemental to the aforesaid short-circuiting connections.

8. The combination of a reciprocating table, a reversing electric motor connected with the table, a resistance in circuit with the motor field, an automatic table actuated switch normally serving to successively reverse the motor and cause it to drive the table successively in opposite directions, means normally under the control of the table actuated switch for short-circuiting the said resistance, a manually operable switch supplemental to the table actuated switch for controlling and reversing the motor, and a relay switch automatically operable to short circuit the motor field resistance upon movement of the supplemental switch to an operative position, the said relay switch being supplemental to the aforesaid short-circuiting means.

9. The combination of a reciprocating table, a reversing electric motor connected with the table, a resistance in circuit with the motor field, an automatic table actuated switch normally serving to successively reverse the motor and cause it to drive the table successively in opposite directions, connections normally under the control of the table actuated switch for short-circuiting the said resistance, a manually operable switch supplemental to the table actuated switch for controlling and reversing the motor, and means automatically operable to render the table operated switch inoperative and also to short-circuit the motor field resistance upon movement of the supplemental switch to an operative position, the said means being supplemental to the aforesaid short-circuiting connections.

10. The combination of a reciprocating table, a reversing electric motor connected with the table, a resistance in circuit with the motor field, an automatic table actuated switch normally serving to successively reverse the motor and cause it to drive the table successively in opposite directions, a manually operable switch supplemental to the table actuated switch for controlling and reversing the motor, and a relay switch automatically operable to render the table operated switch inoperative and also to short-circuit the motor field resistance upon movement of the supplemental switch to an operative position.

11. The combination of a reciprocating table, a reversing electric motor connected to the table, a generator having its armature connected in closed circuit with the motor armature, an adjustable resistance in circuit with the generator field, an automatic table operated switch for successively reversing the field circuit of the generator to change the polarity and thereby successively reverse the motor and cause it to drive the table successively in opposite directions, and a manually operable switch supplemental to the table operated switch for controlling and reversing the field current of the generator, the circuit for the supplemental switch extending through all of the resistance notwithstanding the adjustment.

12. The combination of a reciprocating table, a reversing electric motor connected to the table, a resistance in circuit with the motor field, a generator having its armature connected in closed circuit with the motor armature, an adjustable resistance in circuit with the generator field, an automatic table operated switch for successively reversing the field circuit of the generator to change the polarity and thereby reverse the motor and cause it to drive the table successively in opposite directions, a manually operable switch supplemental to the table operated switch for controlling and reversing the field current of the generator, the circuit for the supplemental switch extending through all of the resistance notwithstanding the adjustment, and a relay switch automatically operable to short-circut the motor field resistance upon movement of the supplemental switch to an operative position.

13. The combination of a reversing electric motor, a reciprocating table connected to the motor to be driven thereby, a generator having its armature connected in closed circuit with the motor armature, a switch controlled automatically by the table for successively reversing the field circuit of the generator to change the polarity thereof thus successively reversing the motor and causing it to drive the table successively in opposite directions, connections for supplying a supplemental reversed current to the generator field, contacts on the switch for momentarily closing the reversed current connections when the switch is moved to reverse the generator field circuit, and a manually operable switch supplemental to the table operated switch for controlling and reversing the field circuit of the generator, the said switch when in operative position serving to render the table operated switch inoperative and to close the said reversed circuit connections.

14. The combination of a reversing electric motor, a reciprocating table connected to the motor to be driven thereby, a generator having its armature connected in closed circuit with the motor armature, a switch controlled automatically by the table for successively reversing the field circuit of the generator to change the polarity thereof thus successively reversing the motor and causing it to drive the table successively in opposite directions, connections for supplying a supplemental reversed current to the generator field, contacts on the switch for momentarily closing the reversed current connections when the switch is moved to reverse the generator field circuit, a manually operable switch supplemental to the table operated switch for controlling and reversing the field circuit of the generator, and a third switch serving to render the table operated switch inoperative and to close the reversed circuit connections when the manually operable switch is in its operative position.

15. In a planer or other machine having a reciprocating table and an adjustable tool, the combination with the table and the tool, of a reversing electric motor connected to the table, a generator having its armature connected in normally closed circuit with the motor armature, an electric tool feeding motor having its armature connected with the generator armature in parallel with the armature of the table driving motor, an automatic table operated switch for successively reversing the field circuit of the generator to change the polarity and thereby successively reverse the said motors, an automatic switch operated by the feed motor for opening the circuit thereof after movement to a predetermined extent, and a table operated switch for closing the circuit of the feed motor simultaneously with the reversal of the generator polarity.

16. In a planer or other machine having a reciprocating table and an adjustable tool, the combination with the table and the tool, of a reversing electric motor connected to the table, a generator having its armature connected in normally closed circuit with the motor armature, an electric tool feeding motor having its armature connected with the generator armature in parallel with the armature of the table driving motor, an automatic table operated switch for successively reversing the field circuit of the generator to change the polarity and thereby successively reverse the said motors, a relay switch in the armature circuit of the feed motor, and two switches in the circuit of the relay switch one operated by the table to close the relay switch simultaneously with the reversal of the generator polarity and the other operated by the feed motor to open the relay switch after rotation of the feed motor to a predetermined extent.

17. In a planer or other machine having a reciprocating table and an adjustable tool, the combination with the table and the tool, of a reversing electric motor connected to the table, a generator having its armature connected in close circuit with the motor armature, an automatic table operated switch for successively reversing the field circuit of the generator to change the polarity and thereby successively reverse the said motor, an electric tool feeding motor having its armature connected with the generator armature in parallel with the armature of the table driving motor, and a switch for opening the circuit through the armature of the table driving motor without opening the circuit through the armature of the feed motor.

18. In a planer or other machine having a reciprocating table and an adjustable tool, the combination with the table and the tool, of a reversing electric motor connected to the table, a generator having its armature connected in closed circuit with the motor armature, an automatic table operated switch for successively reversing the field circuit of the generator to change the polarity and thereby successively reverse the said motor, an electric tool feeding motor having its armature connected with the generator armature in parallel with the armature of the table driving motor, an automatic switch operated by the feed motor for opening the circuit thereof after movement to a predetermined extent, and means for opening the circuit through the armature of the table driving motor without opening the circuit through the armature of the feed motor and for rendering the last automatic switch inoperative, whereby the feed motor is completely controllable by the generator independently of the table driving motor.

19. In a planer or other machine having a reciprocating table and an adjustable tool, the combination with the table and the tool, of a reversing electric motor connected to the table, a generator having its armature connected in closed circuit with the motor armature, an automatic table operated switch for successively reversing the field circuit of the generator to change the polarity and thereby successively reverse the said motor, an electric tool feeding motor having its armature connected with the generator armature in parallel with the armature of the table driving motor, means for disconnecting either motor from the generator independently of the other, and a manually operable switch supplemental to the table operated switch for controlling and reversing the generator field and thus controlling and reversing either motor.

20. In a planer or other machine having a reciprocating table and an adjustable tool, the combination with the table and the tool, of a reversing electric motor connected to the table, a generator having its armature connected in closed circuit with the motor armature, an automatic table operated switch for successively reversing the field circuit of the generator to change the polarity and thereby successively reverse the said motor, an electric tool feeding motor having its armature connected with the generator armature in parallel with the armature of the table driving motor, means for disconnecting either motor from the generator independently of the other, a manually operable switch supplemental to the table operated switch for controlling and reversing the generator field and thus controlling and reversing either motor, and means acting automatically to render the automatic switch inoperative when the manually operable switch is in use.

21. In a planer or other machine having a reciprocating table and an adjustable tool, the combination with the table and the tool, of a reversing electric motor connected to the table, a generator having its armature connected in closed circuit with the motor armature, an automatic table operated switch for successively reversing the field circuit of the generator to change the polarity and thereby successively reverse the said motor, an electric tool feeding motor having its armature connected with the generator armature in parallel with the armature of the table driving motor, means for disconnecting either motor from the generator independently of the other, a manually operable switch supplemental to the table operated switch for controlling and reversing the generator field and thus controlling and reversing either motor, and means for causing the table driving motor to rotate relatively slowly when under the control of the manually operable switch, the said means being inoperative to change the speed of the feed motor.

22. In a planer or other machine having a reciprocating table and an adjustable tool, the combination with the table and the tool, of a reversing electric motor connected to the table, a generator having its armature connected in closed circuit with the motor armature, an automatic table operated switch for successively eversing the field circuit of the generator to change the polarity and thereby successively reverse the said motor, a manually operable switch supplemental to the table operated switch for controlling and reversing the generator field and thus controlling and reversing the motor, and two circuit connections for the automatic switch arranged to be automatically broken when the supplemental switch is used, thus completely disconnecting the automatic switch from the generator field.

In testimony whereof, I hereto affix my signature.

HAROLD L. BLOOD.